United States Patent [19]

Barkowsky et al.

[11] Patent Number: 5,744,523
[45] Date of Patent: Apr. 28, 1998

[54] USE OF POLYACRYLATE ESTERS AS DISPERSANTS

[75] Inventors: Michael Barkowsky, Essen; Jürgen Fock, Düsseldorf; Dietmar Schaefer, Hattingen, all of Germany

[73] Assignee: Th. Goldschmidt AG, Essen, Germany

[21] Appl. No.: 513,314

[22] Filed: Aug. 10, 1995

Related U.S. Application Data

[63] Continuation of Ser. No. 137,875, Oct. 15, 1993, abandoned.

[30] Foreign Application Priority Data

Oct. 28, 1992 [DE] Germany ............... 42 36 337.3

[51] Int. Cl.⁶ .................. C08F 20/28; C08F 8/14; B01F 17/52
[52] U.S. Cl. .............. 523/523; 252/309; 252/314; 252/356; 524/425; 524/437; 524/439; 524/440; 524/441; 524/443; 524/445; 524/447; 524/449; 524/923
[58] Field of Search .................. 252/309, 314, 252/356, 363.5; 524/923, 425, 437, 513, 514, 521, 523, 556, 439, 440, 441, 443, 445, 447, 449; 523/523

[56] References Cited

U.S. PATENT DOCUMENTS

| | | | |
|---|---|---|---|
| 2,120,933 | 6/1938 | Dittmar | 252/356 X |
| 3,180,835 | 4/1965 | Peri | 252/309 |
| 3,671,646 | 6/1972 | Kurita et al. | 524/923 X |
| 3,980,602 | 9/1976 | Jakubauskas | 524/431 |
| 4,558,075 | 12/1985 | Suss et al. | 524/445 X |
| 4,611,028 | 9/1986 | Peng et al. | 524/923 X |
| 4,816,182 | 3/1989 | Novich et al. | 252/309 X |
| 5,133,898 | 7/1992 | Fock et al. | 252/356 |
| 5,338,485 | 8/1994 | Fock et al. | 252/309 |

FOREIGN PATENT DOCUMENTS

| | | | |
|---|---|---|---|
| 2840637 | 3/1980 | Germany . | |
| 3842201 | 5/1990 | Germany . | |
| 3842202 | 5/1990 | Germany . | |
| 3906702 | 9/1990 | Germany . | |
| 4006093 | 8/1991 | Germany . | |
| 4123478 | 1/1993 | Germany . | |
| 0039916 | 10/1978 | Japan | 524/923 |
| 217271 | 4/1984 | Japan . | |
| 145254 | 12/1984 | Japan . | |

*Primary Examiner*—Richard D. Lovering
*Attorney, Agent, or Firm*—Anderson, Kill & Olick, P.C.

[57] ABSTRACT

Polyacrylate esters having an average molecular weight of 1500 to 20,000 and being obtainable by the transesterification of alkyl polyacrylates, obtained by free radical polymerization and containing 1 to 4 carbon atoms in the alkyl group, with a) saturated or unsaturated aliphatic alcohols with 12 to 22 carbon atoms and b) optionally, additionally with dialkylaminoalkanols of the general formula HO—$R^1$—$NR^2R^3$, wherein $R^1$ is a divalent alkylene groups with 2 to 4 carbon atoms and are $R^2$, $R^3$ are the same or different and represent alkyl groups with 1 to 4 carbon atoms, the molar ratio of the aliphatic alcohols a) to the dialkylaminoalkanols b) being 1:0 to 1:1.5, and the components a) and b) being used in such amounts, that 25 to 70% of the ester groups are transesterified, are used as dispersants for finely divided solids, particularly for fillers and pigments, in organic media.

6 Claims, No Drawings

1

USE OF POLYACRYLATE ESTERS AS DISPERSANTS

This is a continuation application of Ser. No. 08/137,875, filed Oct. 15, 1993 and now abandoned.

FIELD OF THE INVENTION

The invention relates to a method of dispersing finely divided solids, particularly fillers and pigments, in organic media in the presence of a dispersing agent which is a polyacrylate ester obtained in a particular manner. The invention also relates to the dispersion so obtained.

BACKGROUND INFORMATION AND PRIOR ART

The use of polyacrylate esters of different compositions as dispersants is known from the state of the art. The following Offenlegungsschriften and patents are named as being representative of the extensive patent literature.

The Japanese publication 61-145 254 describes inorganic and organic pigments which are coated on the surface with a copolymer consisting of 1 to 99% polyalkylene glycol (meth)acrylate and 1 to 99% of alkyl methacrylate, wherein the alkyl groups have 6 to 22 carbon atoms. The coating of carbon black with 10% by weight of copolymer of 25 parts of polypropylene glycol monomethacrylate and 75 parts of octadecanyl methacrylate, the copolymer having a molecular weight of 32,000, is given as an example. The carbon black, so treated, is incorporated in an amount of 0.3% in a polyacetal. When processed in an injection molding machine, the plastic shows improved properties when subjected to heat.

The Japanese publication 60-217 271 relates to cationic dispersants for aqueous pigment dispersions. In this publication, copolymers of fatty acid-modified (meth)acrylate monomers and aminoalkyl methacrylates, the amino groups of which are quaternized, are used as dispersants. For example, 113 parts of stearyl (meth)acrylate, 93 parts N-vinylpyrrolidone and 44 parts of N,N-dimethylaminoethyl (meth)acrylate are copolymerized and quaternized with 1,2-butylene oxide.

In the German Offenlegungsschrift 28 40 637, a method is described for coating titanium dioxide pigments homogeneously with organic polymers. For this method, a dispersion of titanium dioxide in water is treated with an aqueous solution of a polymer containing carboxyl groups and the polymer is applied on the coated pigment. As polymeric compound, those of the general formula

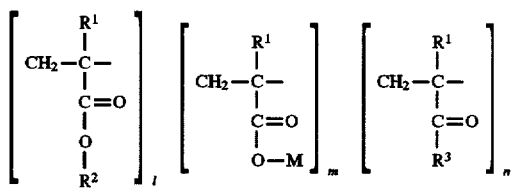

are used, wherein
$R^1$ independently of one another are hydrogen or methyl;
$R^2$ is hydrogen, alkyl or cycloalkyl with 1 to 8 carbon atoms;
M is sodium or potassium cations;
$R^3$ is identical with $R^2$ or preferably hydroxyalkyl with 2 to 6 carbon atoms;
$l$ is 1 part;
$m$ is 0.2–1.5 parts; and $n$ is 0 or 0.1 to 0.5 of the monomeric mole portions.

The compounds are added in weakly alkaline aqueous solution in amounts of about 0.05 to 2.5% by weight, based on titanium dioxide, to the titanium dioxide slurry.

As in the case of the aforementioned Japanese publication, here, too polyelectrolytes are used in aqueous systems.

The same is true for the U.S. Pat. No. 3,980,602, in which a dispersant based on acrylate polymers is claimed. This copolymer is synthesized by the copolymerization of
(1) styrene, alkyl methacrylate or mixtures thereof,
(2) alkyl acrylate, and
(3) acrylic or methacrylic acid.

The copolymers are ground in aqueous dispersion or solution at a pH of 7 to 10 with the pigments.

The present invention therefore is concerned with the technical problem of finding dispersants for finely divided solids, which are suitable for facilitating the dispersion of these solids, particularly finely divided fillers and pigments, in organic media, particularly in plastics, and generally for improving their application properties as, for example, in injection molding. For this purpose, the invention makes use of polyacrylates of a given composition, which have been synthesized in a particular manner.

OBJECT OF THE INVENTION

An object of the present invention is a method of dispersing finely divided solids in organic media in the presence of polyacrylate esters, which have an average molecular weight of 1500 to 20,000 and are obtainable by the transesterification of alkyl polyacrylates, obtained by free radical polymerization and containing 1 to 4 carbon atoms in the alkyl group, with a) saturated or unsaturated aliphatic alcohols with 12 to 22 carbon atoms, and
b) optionally, additionally with dialkylaminoalkanols of the general formula HO—$R^1$—$NR^2R^3$, wherein $R^1$ is a divalent alkylene groups with 2 to 4 carbon atoms and $R^2$, $R^3$ are the same or different and represent alkyl groups with 1 to 4 carbon atoms, the molar ratio of the aliphatic alcohols a) to the dialkylaminoalkanols b) being 1:0 to 1:1.5, and the components a) and b) being used in such amounts, that 25 to 70% of the ester groups are transesterified, as dispersants for finely divided solids, particularly for fillers and pigments, in organic media.

SUMMARY OF THE INVENTION

Such transesterification products have recently been described repeatedly, for example, in the German Patents 38 42 201 and 38 42 202, as well as in the German Offenlegungsschriften 39 06 702, 40 06 093, 41 23 478, 42 02 187 and 42 24 412. These transesterification products have considerable advantages over analogous copolymers, such as a significantly more uniform molecular weight distribution. They are largely free of monomers. The synthesis of polyacrylates, the alcoholic ester component of which has aliphatic double bonds, without forming higher molecular weight by-products, becomes possible at all only by the transesterification method. For example, it is readily possible to transesterify polyacrylate esters with oleyl alcohol and, at the same time, with compounds having further hydroxyl groups.

For the polyacrylates, which are to be used pursuant to the invention, saturated or unsaturated alcohols with 12 to 22 carbon atoms are used as transesterification component a). In particular, the fatty alcohols, derived from naturally occurring fatty acids by hydrogenation, such as lauryl alcohol, myristyl alcohol, palmityl alcohol, stearyl alcohol or behenyl alcohol are utilized. However, the unsaturated alcohols, especially oleyl alcohol, are of special interest. When these are used as transesterification component, particularly effective dispersants are obtained.

Transesterification component b) can additionally be used for the transesterification. However, its use is optional and not absolutely required. The additional use of transesterification component b) depends particularly on the nature of the solids to be dispersed and/or on the nature of the organic medium.

Component b) corresponds to the general formula HO—$R^1$—$NR^2R^3$, the groups preferably having the following meanings within the definitions given in the claim: $R^1$ is a divalent alkylene group with 2 or 3 carbon atoms. $R^2$ and $R^3$ are alkyl groups with 1 or 2 carbon atoms.

The compounds HO—$(CH_2)_2$—$N(CH_3)_2$ and HO—$(CH_2)_2$—$N(C_2H_5)_2$ are particularly preferred as component b).

The molar ratio of component a) to component b) is 1:0 to 1:1.5, a ratio of 1:0 to 1:0.2, however, generally being preferred.

The transesterification is carried out with such amounts of components a) and b) that 25 to 70% transesterification is attained. A degree of transesterification of 40 to 60% is preferred.

The transesterification proceeds in a manner, known from the above-mentioned patents and Offenlegungsschriften, at temperatures of about 70° to 140° C. in the presence of a transesterification catalyst and optionally in the presence of a solvent.

The nonionic dispersants, which are to be used pursuant to the invention, are employed in an amount of about 0.01% to 10% by weight and preferably in an amount of 0.05% to 6% by weight of the solids used.

The dispersants can be applied directly to the solids to be dispersed or added in the organic medium. They can be used in pure form or dispersed as "master batch" in higher concentrations in an organic medium. It is, of course, possible to employ the dispersants, which are to be used pursuant to the invention, together with other auxiliary materials or other dispersants, such as the stearates known as dispersants.

As solids, mineral fillers, such as French chalk, calcium carbonate, dolomite, mica, wollastonite or kaolin, as well as mineral flame retardants, such as aluminum hydroxide or magnesium hydroxide, can be utilized. Suitable pigments are carbon black or titanium dioxide, the latter also being used in finely divided form as UV protection in cosmetic formulations. Further dispersable solids are chemical blowing agents, such as azodicarbamide or mixtures of solid acids and carbonates.

The dispersants, which are to be used pursuant to the invention, can also be used for dispersing ceramic materials, such as finely divided aluminum oxide, silicon carbide or silicon nitride, in organic media. It is furthermore possible to disperse metallic powders, such as finely divided iron or aluminum or powdery rare earth magnet alloys in organic media, with these products, which are to be used pursuant to the invention.

As organic media, such materials as polyethylene, polypropylene, polystyrene, polyamide, polyesters, acrylonitrile/butadiene, ABS, polyvinyl chloride, unsaturated polyesters, polyacrylates, paraffin oils and dioctyl phthalate are utilized.

In particular, the inventive dispersants are suitable for improving the dispersion of finely divided solids in lacquers, binders, thermoplastic and thermosetting materials and polymer blends.

In the following examples, the synthesis (not claimed) of the compounds, which are to be used pursuant to the invention, and of the comparison compounds, is shown first. Application examples for demonstrating the properties of the compounds, which are to be used pursuant to the invention, and for comparing these properties with those of the products of the state of the art, follow, it being understood that these examples are provided by way of illustration and not by way of limitation.

1. EXAMPLES OF THE SYNTHESIS a) Synthesis of the Polymethyl Acrylates, Which are Required for the Transesterification, by Free Radical Polymerization (not of the invention)

A solution of 0.6 g of azodiisobutyronitrile and 20 g of dodecyl mercaptan in 50 g of toluene and 280 g (approximately 3.25 moles) of methyl acrylate is added over a period of 2 hours to a reactor filled with 53 g of toluene. The solvent in the reactor has a temperature of 100° C. and is under an atmosphere of nitrogen. After that, a further 0.9 g of azodiisobutyronitrile, dissolved in 20 g of methyl ethyl ketone, are added over a period of 30 minutes. Finally, the heating of the reaction mixture is continued for a further hour at the same temperature of 100° C. A colorless, viscous liquid with a refractive index of 1.4802 remains. Gel chromatographic analysis reveals that the polymer obtained has a number average molecular weight $M_n$ of 1950 and a weight average molecular weight $M_w$ of 3330. The nonuniformity coefficient therefore is 1.71. The residual monomer content is less than 0.1%.

b) Synthesis of a Transesterification Product from Polymethyl Acrylate, Oleyl Alcohol and Diethylaminoethanol (not of the invention)

The polymethyl acrylate obtained (369.2 g), dissolved in 100 g of toluene, is heated together with 268.0 g (approximately 1 mole) of oleyl alcohol and 117 g (approximately 1 mole) of diethanolaminoethanol under nitrogen to 120° C. To begin with, any traces of water are removed by azeotropic distillation. After that, 3.52 g of isopropyl titanate are added as transesterification catalyst. The methanol, resulting from the transesterification, is separated from toluene by fractionation. Within 3 to 4 hours, a further 10.56 g of isopropyl titanate are added in three equal portions. The reaction is completed after about 6 hours. The end of the reaction is indicated by a stillhead temperature of about 110° C.

The proportion of diethylaminoethanol and oleyl alcohol, determined by gel chromatographic analysis, corresponds to a conversion of 98.0 or 96.3% of the theoretical. The methanol content of the distillate corresponds to a conversion of 96.4% of the theoretical. Gel chromatographic analysis reveals that the polymer obtained has a number average molecular weight $M_n$ of 3328 and a weight average molecular weight of 8288. The nonuniformity coefficient accordingly is 2.49.

Further examples of products, which are to be used pursuant to the invention, are listed in Table 1, which provides the type, molecular weight (MW) and amount of the alkyl polyacrylate and the type and amount of the saturated or unsaturated, longer chain alkanol or dialkylaminoalkanol. In addition, the conversions, determined from the residual content of alkanol or dialkylaminoalkanol, are given.

TABLE 1

| Prod. No. | Polymer Type | Polymer MW | Polymer M(g) | Alkanol a) Type | Alkanol a) M(g) | Alkanol a) Moles | Amino alkanol b) Type | Amino alkanol b) M(g) | Amino alkanol b) Moles | U1(%) | U2(%) |
|---|---|---|---|---|---|---|---|---|---|---|---|
| 1 | PMA | 3000 | 369.2 | OLA | 268.0 | 1.0 | DEAE | 117.0 | 1.0 | 96.3 | 98.2 |
| 2 | PMA | 3000 | 369.2 | OLA | 428.8 | 1.6 | DEAE | 46.8 | 0.4 | 95.7 | 97.6 |
| 3 | PMA | 3000 | 369.2 | OLA | 599.0 | 2.1 | — | — | — | 97.5 | — |
| 4 | PMA | 3000 | 369.2 | LAA | 186.0 | 1.0 | DEAE | 117.0 | 1.0 | 98.4 | 97.9 |

The abbreviations have the following meanings:

PMA=polymethacrylate

OLA=oleyl alcohol

LAA=lauryl alcohol

DEAE=diethylaminoethanol

U1/U2=conversion according to gel chromatography c) Synthesis of Comparison Products by Copolymerization (not of the invention)

A mixture of 1.2 g of azodiisobutyronitrile and 16.4 g of n-dodecyl mercaptan, 113 g (approximately 1.3 moles) of methyl acrylate, 112.9 g (approximately 0.66 moles) of diethylaminoethylacrylate, 157.9 g (approximately 0.66 moles) of lauryl acrylate and 50 g of toluene is added over a period of three hours to a reactor, which is filled with 53 g of toluene and heated to 100° C. Subsequently, a further 0.9 g of azodiisobutyronitrile, dissolved in 20 g of methyl ethyl ketone, is added in the course of 30 minutes. After a further hour of post-reaction time at 100° C., solvent and residual monomers are finally removed under vacuum.

Gel permeation chromatographic analysis reveals a number average molecular weight $M_n$ of 1410 and a weight average molecular weight $M_w$ of 5630. The non-uniformity coefficient therefore is 3.98. The residual monomer content is determined to be 7.7%.

Further comparison polymers are synthesized as follows:

In accordance with Example 6 of the German Offenlegungsschrift 28 40 637, 0.8 g of sodium bisulfite (NaHSO$_3$, 40% aqueous solution) and 1.5 g of a C$_{18}$ alkyl sulfonate in 250 mL of water are added to the reactor. With exclusion of oxygen, a mixture of 59.73 g of methacrylic acid and 88.2 g of butyl acrylate is slowly added dropwise at 40° C. over a period of 1 to 2 hours. At the same time, a solution of 0.5 g of K$_2$S$_2$O$_8$ in 50 mL of water is added in portions over a period of about 2 hours. At the end of the polymerization, a latex with a solids content of 25% is obtained. A viscous solution is formed by the addition of dilute sodium hydroxide solution.

As in Example 7 of the Japanese publication 61-145 254, a solution of 0.6 g of azodiisobutyronitrile and 3.3 g of dodecylmercaptan in 338.0 g (approximately 1.0 moles) of stearyl methacrylate and 196.0 g (approximately 0.33 moles) of polypropylene oxide monomethacrylate is added over a period of 3 hours to a reactor filled with 50 g of toluene. The solvent, which is under nitrogen, has a temperature of 100° C. At the conclusion of the addition, a further 0.9 g of azodiisobutyronitrile, dissolved in 20 g of methyl ethyl ketone, is added over a period of 2 hours. The reaction is completed after 4 hours at a constant temperature of 100° C. After that, the toluene is distilled off at 90° C. and 20 torr. The proportion of stearyl methacrylate and polypropylene oxide monomethacrylate, remaining in the product, is determined by NMR spectroscopic analysis to be 8 to 10%.

Accordingly, the compounds described in Table 2 are available for comparison. In addition, stearic acid and silicone oil from the state of the art are used for comparison:

TABLE 2

| Product No. | |
|---|---|
| 5 | Composition like that of product 4, but synthesized by copolymerization |
| 6 | Copolymer from methacrylic acid and butyl acrylate corresponding to the German Offenlegungsschrift 28 40 637 |
| 7 | Copolymer of polyether acrylate and stearyl methacrylate corresponding to the Japanese publication 61-145 254 |
| 8 | Stearic acid or silicone oil |

2. APPLICATION EXAMPLES

When pigments and fillers are incorporated into lacquers, paints and plastics, the processor expects that the products, obtained with the help of the dispersant used, have generally advantageous rheological properties. In particular, a low viscosity and a finely divided, stable dispersion is desired at high pigment/filler contents.

To check the effectiveness of the dispersants, which are to be used pursuant to the invention, two methods are employed:

Method I:

The pigments or fillers are treated with a solution in toluene of the dispersant to be tested. Subsequently, the toluene is distilled off and the surface-treated material dried under vacuum. The solids, so coated, are subsequently ground in each case to the same agglomerate size in an ultracentrifugal mill (commercially available under the name Type ZMI from Retsch GmbH & Co. KG in Haan; screen size 0.5 mm).

Subsequently, the ground solids are dispersed in paraffin oil (30 cp) using a Mizer disk with a diameter of 4 cm at first for 2 minutes at 2000 rpm (v=4.25 m/s) and subsequently for 3 minutes at 4000 rpm (v=8.5 m/s).

Method II:

The pigments or fillers are added to a specified mixture of paraffin oil and dispersant.

To determine the properties, the viscosities of the dispersions, obtained by the two methods, are measured by a Brookfield spindle viscosimeter (Model LVT) at 23° C. and a rotary speed of 30 rpm using a spindle of size No. 3 or No. 4.

For the comparison experiments, calcium carbonate, titanium dioxide and aluminum hydroxide are used as solids. For the experiments of Method I, these pigments are coated with different amounts of dispersants, namely calcium carbonate with 2% by weight of dispersant, titanium dioxide with 1% by weight of dispersant, aluminum hydroxide with 1% by weight of dispersant.

For the experiments of Method II, when using calcium carbonate 5% by weight of additive, titanium dioxide 3% by weight of additive, aluminum hydroxide 1.5% by weight of additive, in each case based on the solids content, are added to the paraffin oil before the solid is incorporated.

The viscosities of the paraffin oil dispersions, filled with solid are given in Tables 3, 4 and 5.

TABLE 3

Calcium Carbonate Filler

| | Method I | Method II |
| --- | --- | --- |
| | Filler Content | |
| Product Number | 55% | 55% |
| 1 | 760 | 1600 |
| 2 | 600 | 1320 |
| 3 | 480 | 770 |
| 4 | 3200 | 8100 |
| 5 n.e. | 3800 | 10000 |
| 7 n.e. | n.b. | n.b. |
| 8 Stearic acid n.e. | 6800 | n.b. |

Key for Table 3
n.b. = cannot be determined, since the dispersion is creamy or solid
n.e. = comparison - not of the invention

TABLE 4

Titanium Dioxide Filler

| | Method I | Method II |
| --- | --- | --- |
| | Filler Content | |
| Product Number | 40% | 55% |
| 1 | 1560 | 630 |
| 2 | 1400 | 460 |
| 3 | 1240 | 360 |
| 4 | 1520 | 6000 |
| 5 n.e. | 2040 | 8400 |
| 6 n.e. | 1900 | n.a. |
| 7 n.e. | 2600 | 3200 |
| 8 Silicone oil n.e. | 2920 | n.b. |

Key for Table 4:
n.e. = comparison - not of the invention
n.b. = cannot be determined, since the dispersion is creamy or solid
n.a. = not applicable, since emulsion is aqueous

TABLE 5

Aluminum Hydroxide Filler

| | Method I | Method II |
| --- | --- | --- |
| | Filler Content | |
| Product Number | 65% | 55% |
| 1 | 640 | 550 |
| 2 | 500 | 230 |
| 3 | 530 | 250 |
| 4 | 3800 | 3200 |
| 5 n.e. | 4400 | 4000 |
| 7 n.e. | n.b. | n.b. |
| 8 Silicone oil n.e. | n.b. | n.b. |

Key for Table 5:
n.e. = comparison - not of the invention
n.b. = cannot be determined, since the dispersion is creamy or solid The comparison experiments show that the best results are achieved when the component a) is an unsaturated fatty alcohol (oleyl alcohol in the example). These products cannot be synthesized by copolymerization and are obtainable only by the transesterification method. Moreover, it turns out that, even if component a) is a saturated alcohol, the products, which are to be used pursuant to the invention, are superior in their properties to the products of the state of the art, obtained by copolymerization, and to other conventional dispersants.

We claim:

1. A method of dispersing finely divided particles in lacquer, binder, polymer blend, paraffin oil, thermoplastic or thermosetting material by adding a dispersing agent, wherein the dispersing agent is a polyacrylate ester of an average molecular weight of about 1,500 to 20,000 and is obtained by transesterification of alkyl polyacrylates containing 1 to 4 carbons atoms in the alkyl group, with saturated or unsaturated aliphatic alcohols having 12 to 22 carbon atoms in such a way so that 25 to 70% of the ester groups are transesterified.

2. The method of claim 1, wherein the finely divided particles are fillers or pigments.

3. The method of claim 1 or 2, wherein the organic medium is selected from the group consisting of polyethylene, polypropylene, polystyrene, polyamide, polyester, acrylonitrile, polyvinyl chloride, unsaturated polyester, polyacrylate, paraffin oil and dioctyl phthalate.

4. The method of claim 2, wherein the filler is selected from the group consisting of French chalk, calcium carbonate, dolomite, mica, wollastonite and kaolin and the pigment is selected from the group consisting of carbon black and titanium dioxide.

5. The method of claim 1, wherein the finely divided particle is selected from the group consisting of finely divided aluminum oxide, silicon carbide, silicon nitride, iron, aluminum and rare earth magnet alloys.

6. A dispersion of finely divided particle in a medium of lacquer, binder, polymer blend, paraffin oil, thermoplastic or thermosetting material containing a dispersing agent, wherein the dispersing agent is a polyacrylate ester of an average molecular weight of about 1,500 to 20,000 and is obtained by transesterification of alkyl polyacrylates containing 1 to 4 carbon atoms in the alkyl group, with saturated or unsaturated aliphatic alcohols having 12 to 22 carbon atoms in such a way so that 25 to 70% of the ester groups are transesterified, in an amount sufficient to disperse the particle in the medium.

* * * * *